United States Patent
Dotz et al.

(10) Patent No.: US 12,362,617 B2
(45) Date of Patent: Jul. 15, 2025

(54) DRIVE EQUIPMENT FOR AN ELECTRIC VEHICLE, AND VEHICLE

(71) Applicant: Valeo eAutomotive Germany GmbH, Erlangen (DE)

(72) Inventors: Boris Dotz, Erlangen (DE); Daniel Fritsch, Erlangen (DE)

(*) Notice: Subject to any disclaimer, the term of this patent is extended or adjusted under 35 U.S.C. 154(b) by 310 days.

(21) Appl. No.: 18/055,914

(22) Filed: Nov. 16, 2022

(65) Prior Publication Data

US 2023/0155437 A1 May 18, 2023

(30) Foreign Application Priority Data

Nov. 16, 2021 (EP) .................................... 21208427

(51) Int. Cl.
*H02K 3/28* (2006.01)
*H02K 3/12* (2006.01)

(52) U.S. Cl.
CPC ................. *H02K 3/28* (2013.01); *H02K 3/12* (2013.01); *H02K 2213/03* (2013.01)

(58) Field of Classification Search
CPC ........ H02K 3/28; H02K 3/12; H02K 2213/03; H02K 29/03; H02K 1/16; H02K 3/14; H02K 7/116; B60L 2220/50; B60L 53/22; B60L 2260/00; B60K 6/26; F16H 57/02; H02P 25/16; B60Y 2200/91
See application file for complete search history.

(56) References Cited

U.S. PATENT DOCUMENTS

2011/0198953 A1* 8/2011 Shinohara ................ H02K 3/12
310/71
2017/0104377 A1* 4/2017 Kudose ................ H02K 1/2706

FOREIGN PATENT DOCUMENTS

JP 5935587 B2 6/2016

* cited by examiner

*Primary Examiner* — Thomas Truong
(74) *Attorney, Agent, or Firm* — Osha Bergman Watanabe & Burton LLP

(57) ABSTRACT

Drive equipment for an electric vehicle is disclosed with a stator which is configured for generating a magnetic rotating field, a stator core in which a multiplicity of slots disposed in the circumferential direction are configured, and a stator winding which occupies a plurality of winding zones in the slots. Each winding zone in a cross-sectional plane that is perpendicular to the longitudinal axis by way of a centric radial division is sub-divided into a first side and a second side. Converter equipment converts magnetic energy of the rotating field into a rotating output movement of the drive equipment. The converter equipment has a rotor which conjointly with the stator forms a rotating electric machine such that the rotor is able to be set in a rotating rotor movement which, as a function of the rotating field, selectively has one of two opposite rotation directions.

15 Claims, 10 Drawing Sheets

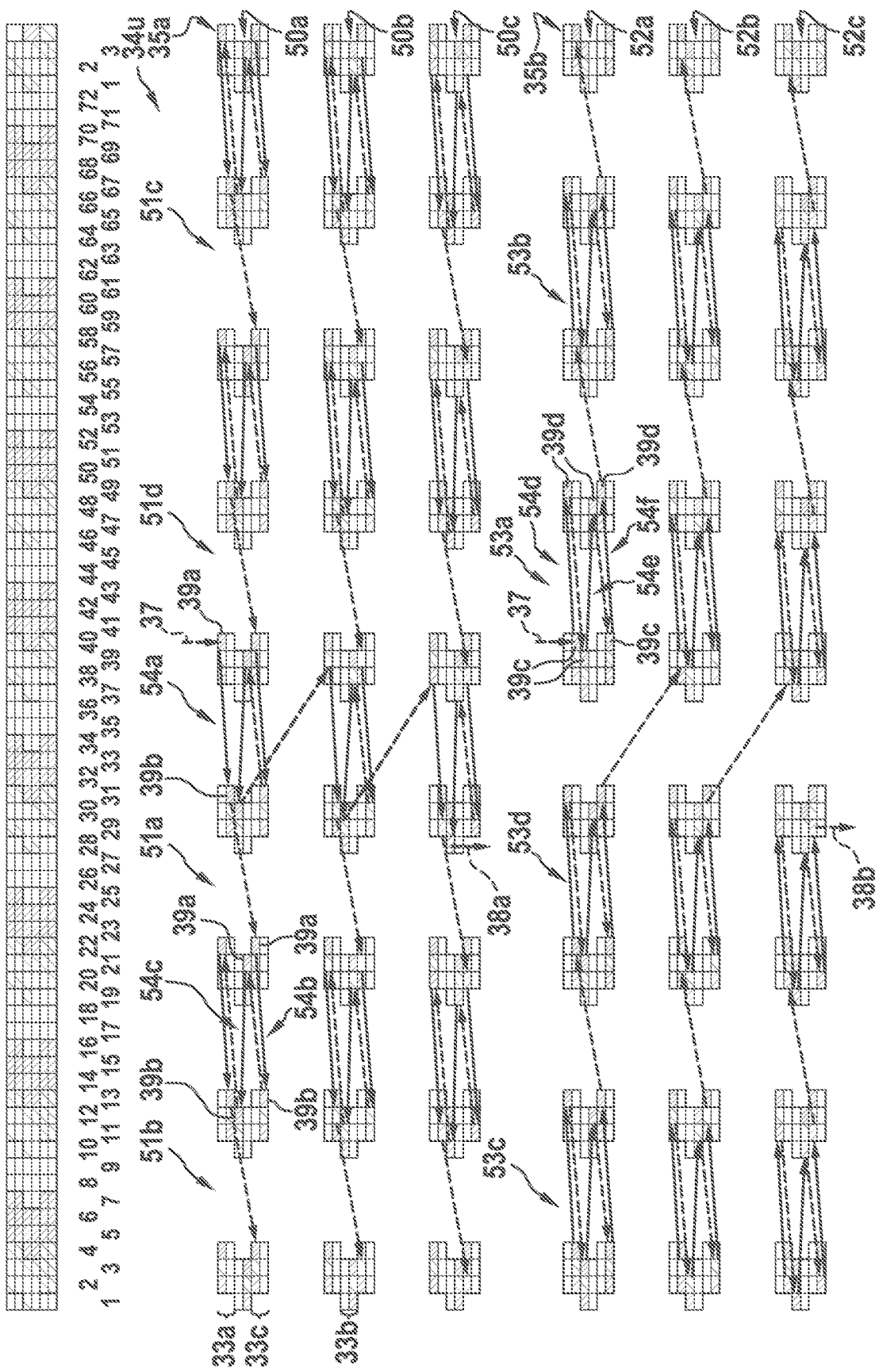

DRIVE EQUIPMENT FOR AN ELECTRIC VEHICLE, AND VEHICLE

The present invention relates to a drive equipment for an electric vehicle, having: a stator which is configured for generating a magnetic rotating field and has: a stator core which extends along a longitudinal axis and in which a multiplicity of slots disposed in the circumferential direction are configured, and a stator winding which occupies a plurality of winding zones in the slots, wherein each winding zone in a cross-sectional plane that is perpendicular to the longitudinal axis by way of a centric radial division is sub-divided into a first side and into a second side; and a converter equipment for converting magnetic energy of the rotating field into a rotating output movement of the drive equipment, wherein the converter equipment has a rotor which conjointly with the stator forms a rotating electric machine such that the rotor is able to be set in a rotating rotor movement which, as a function of the rotating field, selectively has one of two opposite rotation directions, and has a transmission portion which is configured for transmitting rotating rotor movements to the rotating output movement.

In addition, the invention relates to a vehicle.

JP 5 935 587 B2 discloses an electric machine and a gearbox which are disposed in a parallel-hybrid vehicle. The electric machine has a stator having a stator core and a stator winding as well as a rotor.

In electrically driven vehicles, an ideally smooth delivery of torque, i.e., a delivery of torque with as few ripples as possible, is desirable in order to achieve a positive NVH (noise, vibration, harshness) behaviour. This can be achieved in particular by way of minor torque ripples and minor parasitic forces in an electric machine of the drive equipment. In the case of stator windings of a stator of the electric machine, a required number of windings are to be disposed symmetrically, with a minor winding overhang, and so as to be easy to connect and in a production-friendly manner with a view to au-tomated production with a high level of process reliability, in a stator core of the stator.

The invention is based on the object to configure an option for driving a vehicle with minor torque ripples.

In a drive equipment of the type mentioned at the outset, this object is achieved according to the invention in that the converter equipment has one of the two rotation directions of the rotating rotor movement as the preferred rotation direction, wherein the second side along the preferred rotation direction succeeds the first side and each winding zone on the first side occupies a smaller cross-sectional area of the slots than on the second side.

The drive equipment according to the invention has a stator. The stator is configured for generating a magnetic rotating field. The stator has a stator core. The stator core extends along a longitudinal axis. A multiplicity of slots are configured in the stator core. The slots are disposed in the circumferential direction. The stator furthermore has stator windings. The stator winding occupies a plurality of winding zones in the slots. Each winding zone in a cross-sectional plane by way of a centric radial division is subdivided into a first side and into a second side. The cross-sectional plane is perpendicular to the longitudinal axis. The drive equipment furthermore has a converter equipment for converting magnetic energy of the rotating field into a rotating output movement of the drive equipment. The converter equipment has a rotor. The rotor conjointly with the stator forms a rotating electric machine such that the rotor is able to be set in a rotating rotor movement. The rotating rotor movement, as a function of the rotating field, selectively has one of two opposite rotation directions. The converter equipment furthermore has a transmission portion. The transmission portion is configured for transmitting the rotating rotor movement to the rotating output movement. The converter equipment furthermore has one of the two rotation directions of the rotating rotor movement as the preferred rotation direction. The second side along the preferred rotation direction succeeds the first side. Each winding zone on the first side occupies a smaller cross-sectional area of the slots than on the second side.

The invention is based on the concept that in the case of the winding zones being occupied in a non-uniform manner, a more favourable NVH behaviour is achieved in one rotation direction than along the other rotation direction of the rotating rotor movement. The invention exploits this concept in that the occupation of the winding zones is chosen according to the preferred rotation direction of the drive equipment. Achieved as a result is low torque ripple, this enabling particularly smooth running of the electric machine, while at the same time the stator winding is symmetrically disposed in the slots.

The stator core is typically configured from a multiplicity of individual sheets which are disposed in a stack and/or mutually isolated. To this extent, the stator core can also be referred to as laminated stator core. The cross-sectional plane is defined in particular by the radial direction and the circumferential direction. The radial division runs in particular on a plane that is defined by the longitudinal axis and the radial direction. The stator core typically has an end side and a further end side that lies opposite the end side.

The rotor can be permanently excited or not permanently excited. The rotor can be separately excited. The rotor can be magnetically excited or voltage-excited. The transmission portion is in particular also configured for converting the rotating rotor movement into the rotating output movement. The rotation directions of the rotating rotor movement can also be un-derstood to be orientations of the rotating rotor movement so that the preferred rotation direction corresponds to a preferred orientation.

Each winding zone preferably extends across at least two slots, particularly preferably across at least three slots, or at least four slots. Portions of the stator winding that are associated with the same phase of the electric machine are typically disposed in each winding zone.

The division can run through the $[(x+1)/2]^{th}$ slot of a respective winding zone when x is odd, and run so as to be centric between the $(x/2)^{th}$ and the $[(x/2)+1]^{th}$ slot of a respective winding zone when x is even, x describing the number of slots occupied by a respective winding zone.

The preferred rotation direction can be predefined in various ways. In general, a presence of the preferred rotation direction of the rotating rotor movement can initiate the vehicle to travel forward, and a presence of the other rotation direction of the rotating rotor movement can initiate the vehicle to travel in reverse.

It is possible for an efficiency of the transmission portion in the preferred rotation direction to be higher than in the other rotation direction. In other words, the transmission portion can be configured in such a manner that the transmission of the rotating rotor movement to the rotating output movement in the presence of the preferred rotation direction is more efficient than in the presence of the other rotation direction of the rotating rotor movement. For example, mechanical losses of the transmission portion are less in the presence of the preferred rotation direction than in the presence of the other rotation direction.

It can also be provided that the transmission portion has a gearbox having an asymmetrical design embodiment that determines the preferred rotation direction. For example, a respective tooth of mutually meshing gear wheels of the gearbox can thus be of an asymmetrical configuration.

The drive equipment can furthermore have a control equipment for the transmission portion, which for the preferred rotation direction has a larger number of selectable operating modes than for the other one of the rotation directions. A larger number of operating modes can thus be provided for forward travel than for travel in reverse.

It is also possible for the drive equipment to have a ventilation equipment which in the preferred rotation direction has a higher cooling efficiency than in the other one of the rotation directions. For example, the higher cooling efficiency can be derived from the position of an air intake, the latter in the presence of the preferred rotation direction receiving headwind.

The stator winding in the drive equipment according to the invention can be configured as a round-wire winding.

Alternatively, the stator winding can be configured as a shaped conductor winding, in particular as a hairpin winding. The stator winding in a shaped conductor winding is configured, in particular, by a multiplicity of shaped conductors which configure a current path, or a plurality of current paths, for a current which for generating the rotating field passes through the stator winding. The shaped conductors can be configured from a metal rod and/or have a rectangular or radiused rectangular cross section. Each part, or one part, of the shaped conductor preferably has two straight portions which extend in the axial direction within a respective slot. The straight portions can be connected to one another by a coil end portion on the first end side of the stator core. Each straight portion on the further end side of the stator core can be adjoined by an end portion. The straight portions are preferably configured so as to be integral to the coil end portion and/or to the end portions. The end portions of two respective shaped conductors are preferably mechanically connected to one another in an electrically conductive and materially integral manner, in particular by welding, so as to configure the stator winding. Moreover, one part of the shaped conductors, in particular for connecting the stator winding to a phase connector and/or to one or a plurality of neutral points provided shaped conductor, can have a straight portion, a connector portion on the first end side, and an end portion on the further end side.

In the drive equipment according to the invention it is preferable that the stator winding has a number of N strands and a number of 2·P poles, and the number of slots is 2·P·N·q, where q≥2, and each winding zone extends across at least q+1 of the slots, where P, N and q are natural numbers. q can also be referred to as the hole count, or the number of slots for each pole and phase, respectively. Each winding zone is preferably radially subdivided into first to $L^{th}$ tiers which are designated according to their sequence in the radial direction, wherein the tiers configure first to $(L/2)^{th}$ double tiers, wherein the double tier comprises the $(2i-1)^{th}$ and the $(2i)^{th}$ tier for all $1 \leq i \leq (L/2)$, where L≥6 and is even, where L and i are natural numbers. The number of the tiers can be 6, 8, 10, 12, 14 or 16. In a design embodiment of the stator winding as a hairpin winding, a straight portion of one of the shaped conductors can be disposed in each tier.

A number of the double tiers, being less than the number of the other double tiers, is preferably displaced by at least one slot counter to the preferred rotation direction in relation to the other double tiers counter to the preferred rotation direction. Such a disposal of the double tiers may also be referred to as a non-uniform pitch of the stator winding. It can be achieved as a result that each winding zone of the first side occupies the smaller cross-sectional area than on the second side. In particular, a radially outer double tier, a radially inner double tier or a radially central double tier may be displaced.

It can moreover be provided that each winding zone in the circumferential direction is subdivided into first to $q^{th}$ sub-winding zones which comprise in each case all tiers and are designated according to their sequence in the circumferential direction, wherein the stator winding for a respective strand has a phase winding, wherein the phase winding comprises at least one sub-winding which forms a current path and comprises internal portions that are disposed within the slots, and connection portions that are disposed on end sides of the stator core and in each case connect in an electrically conductive manner two internal portions which are directly successive in terms of the current path. The internal portions can be configured by the straight portions of the shaped conductors. The connection portions on the first end side can be configured by the end coil portions of the shaped conductors. The connection portions on the further end side can be configured by the connected end portions of two different shaped conductors.

The stator winding can have a neutral point. The at least one sub-winding of a respective strand can be wired so as to form the neutral point. The stator winding can also have two neutral points and a plurality of sub-windings for each strand. In this instance, one of the sub-windings of a respective strand can be wired so as to form one of the neutral points, and another one of the sub-windings of a respective strand can be wired so as to form the other of the neutral points, According to a first variant of design embodiment, the sub-winding can comprise a plurality of conductor sequences of successive internal portions in terms of the current path, wherein each conductor sequence is disposed in one of the double tiers and forms a full encirclement of the stator core. In this way, a wave winding can be configured as a stator winding.

It is also preferable for first to $L/2^{th}$ of the conductor sequences to run in each case along a circumferential direction, in particular along the preferred rotation direction, wherein $[(L/2)+1]^{th}$ to $L^{th}$ of the conductor sequences run in each case along a further circumferential direction that is counter to the circumferential direction. As a result, the wave winding can be wound in the opposite direction.

In a refinement it can be provided that each conductor sequence which directly succeeds another conductor sequence in terms of the current path is disposed in a different sub-winding zone than the other conductor sequence In the first variant of design embodiment it is furthermore preferable for a further sub-winding, which corresponds to the sub-winding, to be provided, wherein a respective internal portion of the further sub-winding that lies in the same tier of the same winding zone as an internal portion of the sub-winding, is disposed in a different sub-winding zone than the sub-winding zone in which the internal portion of the sub-winding lies. To this extent, the sub-winding can also be referred to as the first sub-winding, and the further sub-winding can be referred to as the second sub-winding.

A second and a third variant of design embodiment will be described hereunder.

In order for a combined lap/wave winding to be formed in the second and the third variant of design embodiment, it can be provided that one of the at least one sub-winding comprises a set of first to $P^{th}$ conductor sequences of the first type that are successive in the sequence of their designation in terms of the current path and are in each case disposed in first to fourth directly adjacent winding zones for the same strand. Each conductor sequence of the first type preferably comprises first to $(L/2)^{th}$ pairs of one first of the internal portions and one second of the internal portions, and the pairs are designated according to their sequence along the current path. The first and second internal portions can be disposed in different tiers of the same double tier. It is preferable here for the first pair to be disposed in the first double tier, wherein the second pair is disposed in the $(L/2)^{th}$ double tier, wherein the third pair is disposed in the second double tier, or the third to $(L/2)^{th}$ pairs are disposed in the second to $[(L/2)-1]^{th}$ double tier. The third winding zone, in which the internal portions of the first to $(P-1)^{th}$ conductor sequences are disposed, can be the first winding zone in which the conductor sequence that succeeds the conductor sequence in terms of the current path is disposed. The fourth winding zone in which the internal portions of the first to $(P-1)^{th}$ conductor sequences are disposed, can be the second winding zone in which the conductor sequence that succeeds the conductor sequence in terms of the current path is disposed. This sub-winding can also be referred to as the first sub-winding.

In the second and the third variant of design embodiment it can alternatively or additionally be provided that one of the at least one sub-winding comprises a set of first to $P^{th}$ conductor sequences of the second type that are successive in the sequence of their designation in terms of the current path and are in each case disposed in two directly adjacent winding zones for the same strand. It is preferably provided that each conductor sequence of the second type comprises first to $(L/2)^{th}$ pairs of one first of the internal portions and one second of the internal portions, and the pairs are designated according to their sequence along the current path. The first and the second internal portions here can be disposed in different tiers of the double tier corresponding to the designation of the pair. It is preferably provided that the first to $(P-1)^{th}$ conductor sequences of the second type by way of one of the connection portions are connected to the conductor sequence of the second type that is successive along the current path, and the succeeding conductor sequence of the second type is disposed in two directly adjacent winding zones for the same strand. This sub-winding can also be referred to as the second sub-winding.

The sub-windings preferably run about the stator core in opposite circumferential directions.

In the second variant of design embodiment it can be provided that the first internal portion of the pairs of the conductor sequences of the or of a respective sub-winding is disposed in one of the tiers of the double tier, and the second internal portion of the pairs of the conductor sequences of the or of a respective sub-winding is disposed in the other one of the tiers of the double tier.

In the third variant of design embodiment, the first internal portion of the pairs of the conductor sequences with an odd-numbered designation of the or of a respective sub-winding can be disposed in one of the tiers of the double tier, the second internal portion of the pairs of the conductor sequences with an odd-numbered designation of the or of a respective sub-winding can be disposed in the other tier of the double tier, the first internal portion of the pairs of the conductor sequences with an even-numbered designation of the or of a respective sub-winding can be disposed in the other tier of the double tier, and the second internal portion of the pairs of the conductor sequences with an even-numbered designation of the or of a respective sub-winding can be disposed in the one tier of the double tier.

In a preferred design embodiment it can furthermore be provided that the or a respective sub-winding comprises in total q sets of the conductor sequences which are in each case disposed in the same sub-winding zone, wherein each set that directly succeeds another set of the same sub-winding in terms of the current path, is disposed in a different sub-winding zone than the other set.

The object on which the invention is based is furthermore achieved by a vehicle comprising a drive equipment according to the invention, which is configured for driving the vehicle.

The preferred rotation direction can also be an installed position of the drive equipment in a vehicle body. The rotating output movement preferably acts on an axle and/or on wheels of the vehicle.

A winding zone contains only portions of the stator winding of the same strand, i.e. U. V, or W.

A winding zone in the circumferential direction can extend across a specific number of slots. Said winding zone in terms of these slots can be divided in a radially centric manner in the circumferential direction. These parts can be identified as a first and a second sub-winding zone.

Further advantages and details of the present invention can be derived from the exemplary embodiments described below and by means of the drawings. The latter are schematic illustrations in which:

FIG. 10 shows a winding diagram of a phase of the stator winding according to the third exemplary embodiment.

FIG. 1 shows a schematic diagram of an exemplary embodiment of a vehicle 1 having a first exemplary embodiment of a drive equipment 2.

Figure 1:
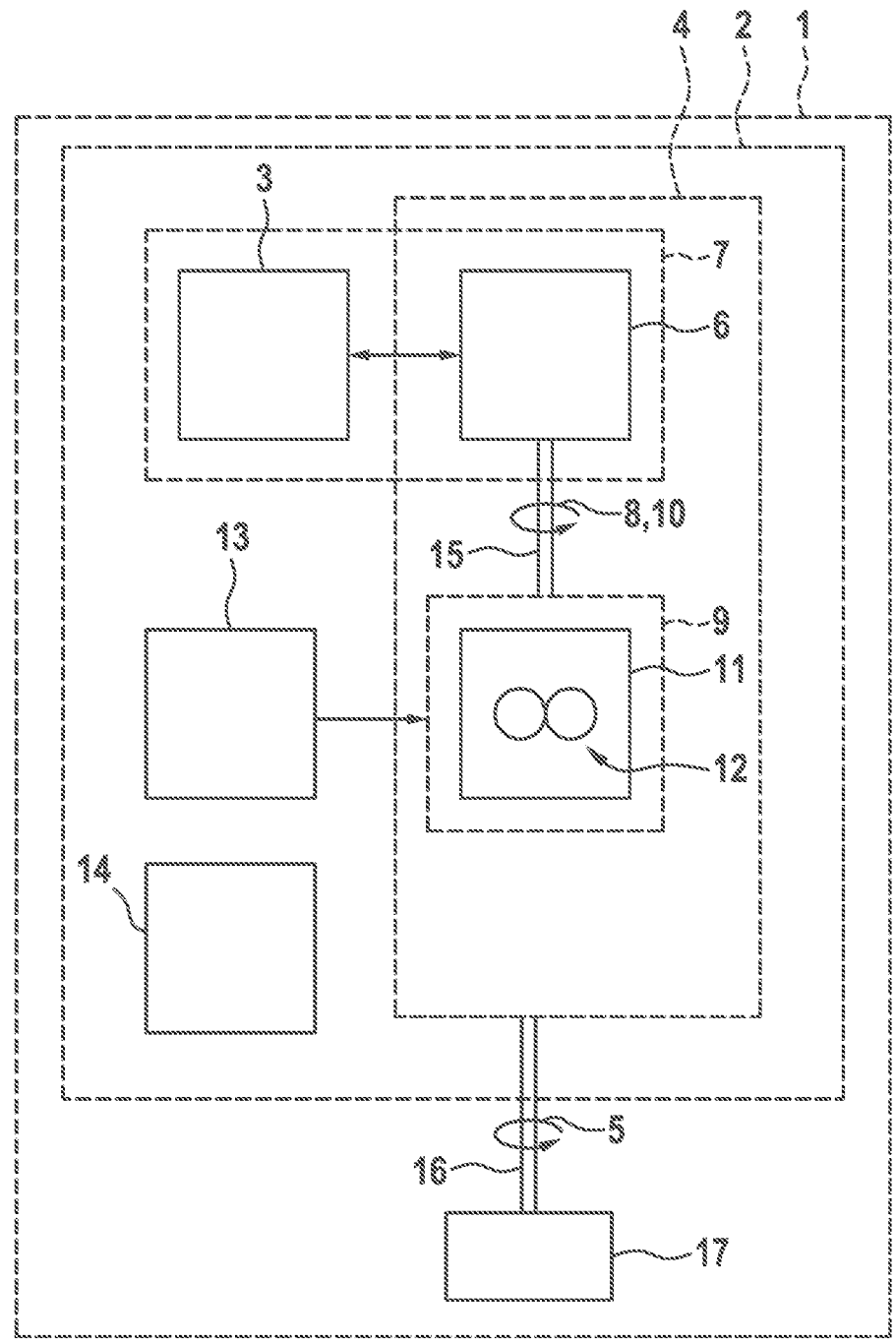
FIG. 1 shows a schematic diagram of an exemplary embodiment of the vehicle according to the invention, having a first exemplary embodiment of the drive equipment according to the invention.

The drive equipment 2 has a stator 3 which is configured for generating a magnetic rotating field. The drive equipment 2 furthermore has a converter equipment 4 for converting magnetic energy of the rotating field into a rotating output movement 5 of the drive equipment 2.

The converter equipment 4 has a rotor 6 which conjointly with the stator 3 forms a rotating electric machine 7 such that the rotor 6 is able to be set in a rotating rotor movement 8.

The converter equipment 4 moreover has a transmission portion 9 which is configured for transmitting and converting the rotating rotor movement 8 to the rotating output movement 5.

The transmission portion 9 has one of the two rotation directions of the rotating rotor movement 8 as the preferred rotation direction 10. The latter results in particular from an efficiency of the transmission portion 9 in the preferred rotation direction 10 being higher than in the other one of the rotation directions. Accordingly, the transmission portion 9 is configured in such a manner, for example, that the transmission of the rotating rotor movement 8 to the rotating output movement 5 in the presence of the preferred rotation direction 10 is more efficient than in the presence of the other rotation direction of the rotating rotor movement 8.

The preferred rotation direction 10 can also result from the transmission portion 7 having a gearbox 11 having an asymmetrical design embodiment that determines the preferred rotation direction 9 To this end, a respective tooth of mutually meshing gear wheels 12 of the gearbox 11 can be of an asymmetrical configuration, for example. Likewise, the preferred rotation direction 10 can also result from the drive equipment 2 having a control equipment 13 for the transmission portion 9, which for the preferred rotation direction 10 has a larger number of selectable operating modes than for the other one of the rotation directions. A larger number of operating modes can thus be provided for the forward travel than for the travel in reverse of the vehicle 1. Furthermore, the preferred rotation direction 10 can also result from the drive equipment 2 having a ventilation equipment 14 which in the preferred rotation direction 10 has a higher cooling efficiency than in the other one of the rotation directions. Moreover, the preferred rotation direction 10 can also be a result of an installed position of the drive equipment 2 in the vehicle 1.

As is furthermore shown in FIG. 1, the rotating rotor movement 8 by way of a shaft 15 of the drive equipment 2 acts on the transmission portion 9. The rotating output movement 5 by way of an axle 16 of the vehicle 1 acts on the wheels 17 of the latter.

Figure 2:
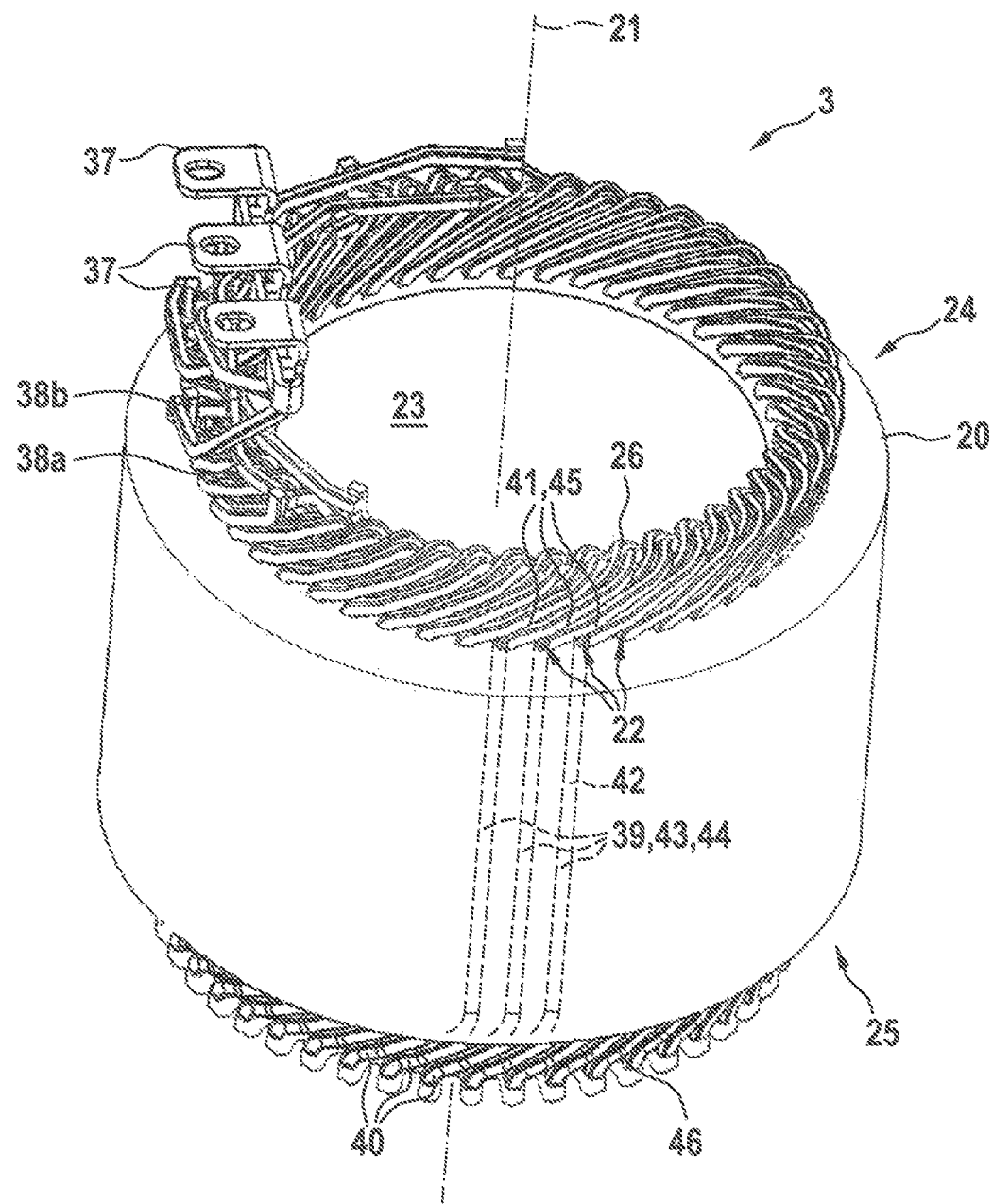
FIG. 2 shows a perspective view of the stator of the drive equipment according to the first exemplary embodiment.

FIG. 2 shows a perspective view of the stator 3 of the drive equipment 2 according to the first exemplary embodiment.

The stator 3 has a stator core 20 which extends along a longitudinal axis 21 and in which a multiplicity of slots 22 disposed in the circumferential direction are configured. The stator core 20 in an exemplary manner here surrounds a receptacle space 23 for the rotor 6 (see FIG. 1) and has a first end side 24 and a second end side 25 that lies opposite said first end side 24. Moreover, the stator 3 has a stator winding 26.

Figure 3:
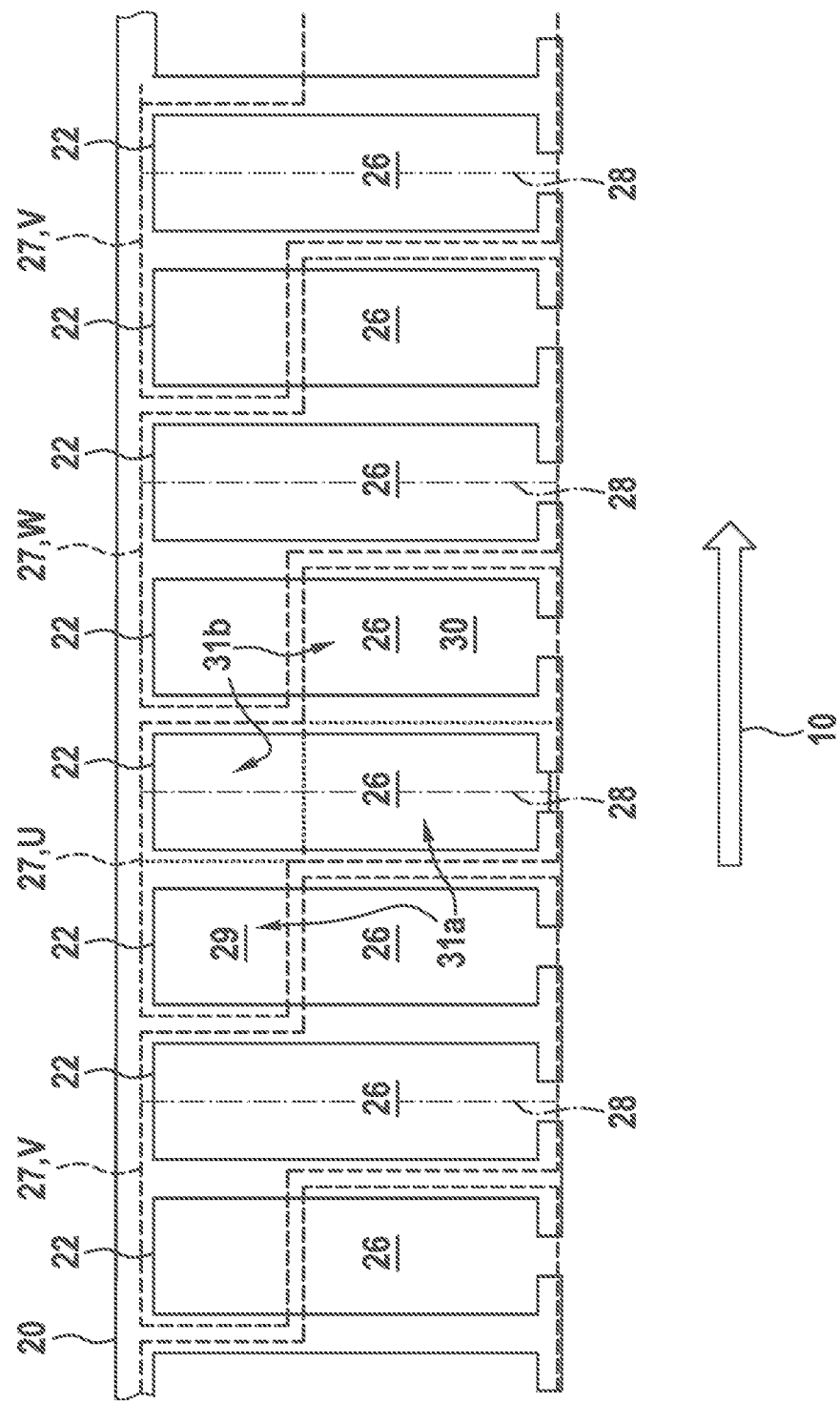
FIG. 3 shows a schematic diagram of the stator winding disposed in the stator core, according to the first exemplary embodiment.

FIG. 3 shows a schematic diagram of the stator winding 26 disposed in the stator core 20.

The stator winding occupies a plurality of winding zones 27 in the slots 22. Each winding zone here in a cross-sectional plane, which corresponds to the plane of the drawing in FIG. 3, that is perpendicular to the longitudinal axis 21 (see FIG. 2), by a centric radial division 28 is subdivided into a first side 29 and into a second side 30. In the present exemplary embodiment, each winding zone 27 in an exemplary manner extends across three slots 22 such that the division 28 runs so as to be centric through the second of the three slots 22 of the winding zone 27.

The second side 30 along the preferred rotation direction 10 is successive to the first side 29. As can be seen, each winding zone 27 on the first side 29 occupies a smaller cross-sectional area of the slots 22 than on the second side 30.

It can furthermore be seen in FIG. 3 that the stator winding 26 has N=3 strands U, V, W for a respective phase of the electric machine 7 (see FIG. 1). Each winding zone 27 contains only proportions of the stator winding 26 of the same strand U, V, W. A hole count q of the stator winding 26 in the present exemplary embodiment is two. Each winding zone 27 presently extends across a number of slots 22, said number being q+1. Moreover, each winding zone 27 is sub-divided into first to $q^{th}$ sub-winding zones 31a, 31b, specifically into a first sub-winding zone 31a and into a second sub-winding zone 31b.

Figure 4:
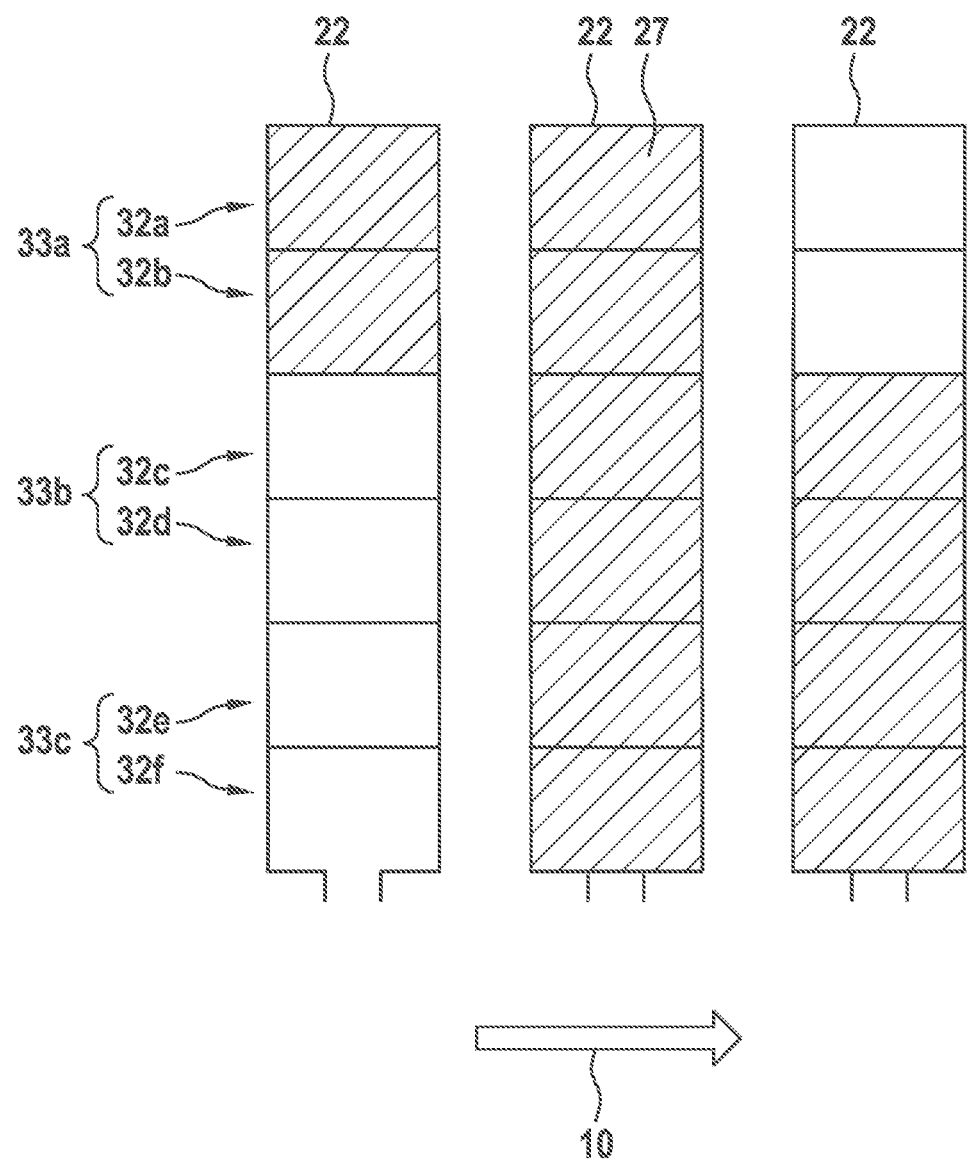
FIG. 4 shows a schematic diagram of a winding zone in the slots, according to the first exemplary embodiment.

FIG. 4 shows a schematic diagram of a winding zone 27 in the slots 22.

Each winding zone 27, which in FIG. 3 is identified by a hatched area, is radially sub-divided into first to sixth ($L^{th}$) tiers, the latter being designated according to their sequence in the radial direction from radially outside to radially inside. The tiers 32a-f form first to third $[(L/2)^{th}]$ double tiers 33a-d, wherein the $i^{th}$ double tier comprises the $(2i-1)^{th}$ and the $(2i)^{th}$ tier for all $1 \leq i \leq (L/2)$. Accordingly, the first double tier 33a comprises the first tier 32a and the second tier 32b, the second double tier 33b comprises the third tier 32c and the fourth tier 32d, and the third double tier 33c comprises the fifth tier 32e and the sixth tier 32f. A double tier 33a, presently the radially outer-most double tier 33a, is displaced by a slot 22 counter to the preferred rotation direction 10 in relation to the other double tiers 33b, 33c counter to the preferred rotation direction.

Figure 5:
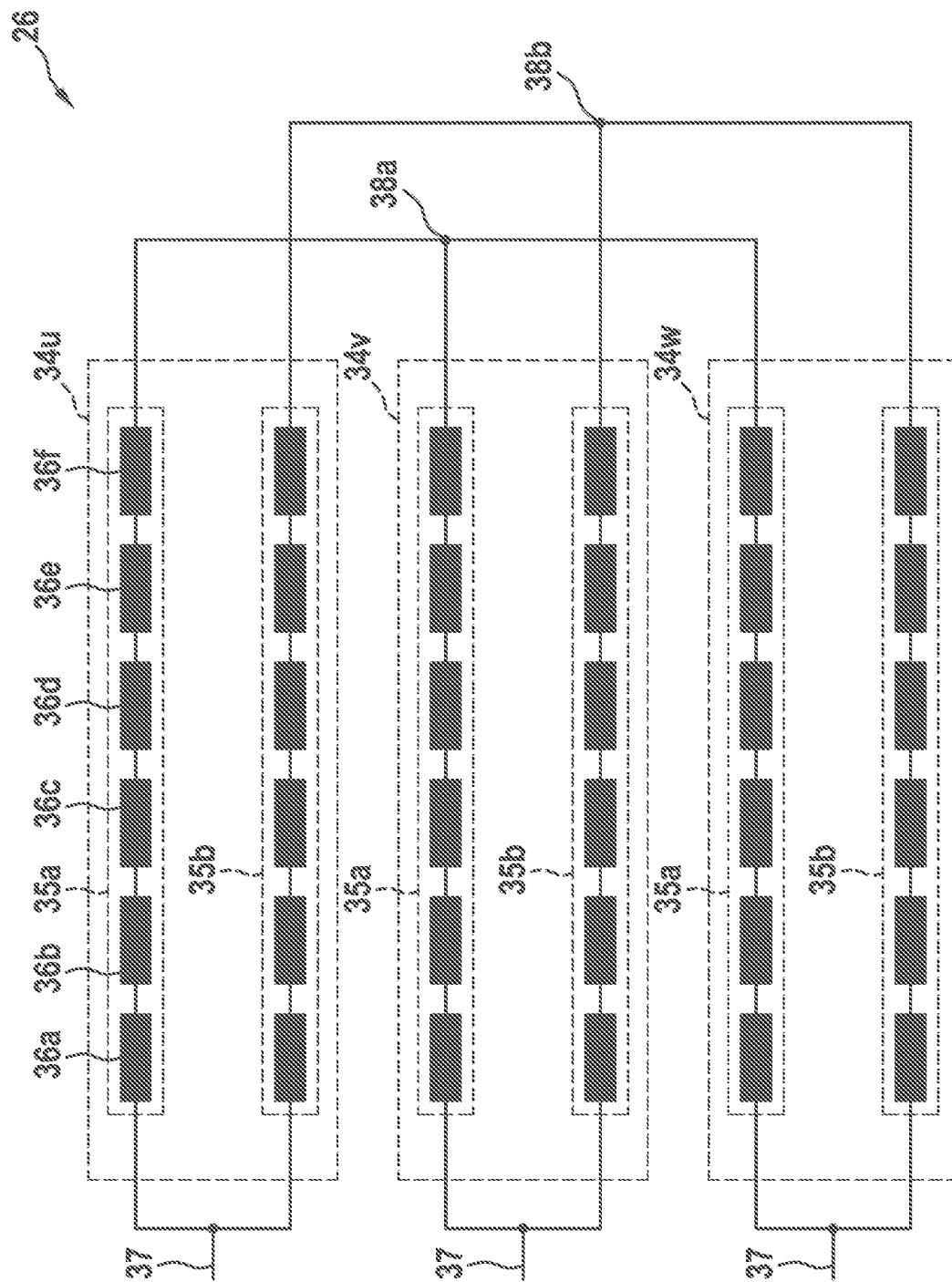
FIG. 5 shows a block circuit diagram of the stator winding according to the first exemplary embodiment.

FIG. 5 shows a block circuit diagram of the stator winding 26 according to the first exemplary embodiment.

The stator winding 23 for each strand U, V, W has a phase winding 34u, 34v, 34w. Each phase winding 34u, 34v, 34w comprises a first sub-winding 35a and a second sub-winding 35b, which in each case configure a current path. Each sub-winding 35a, 35b comprises a number of conductor sequences 36a-f which correspond to the number of layers L and are connected in series.

Each phase winding 34u, 34v, 34w is connected to a phase connector 37. The phase windings 34u, 34v, 34w are furthermore wired so as to form two neutral points 38a, 38b, wherein the first sub-windings 35a are wired so as to form the first neutral point 38a, and the second sub-windings 35b are wired so as to form the second neutral point 38b. The phase connectors 37 and the neutral points 38a, 38b are also illustrated in FIG. 2.

Figure 6:
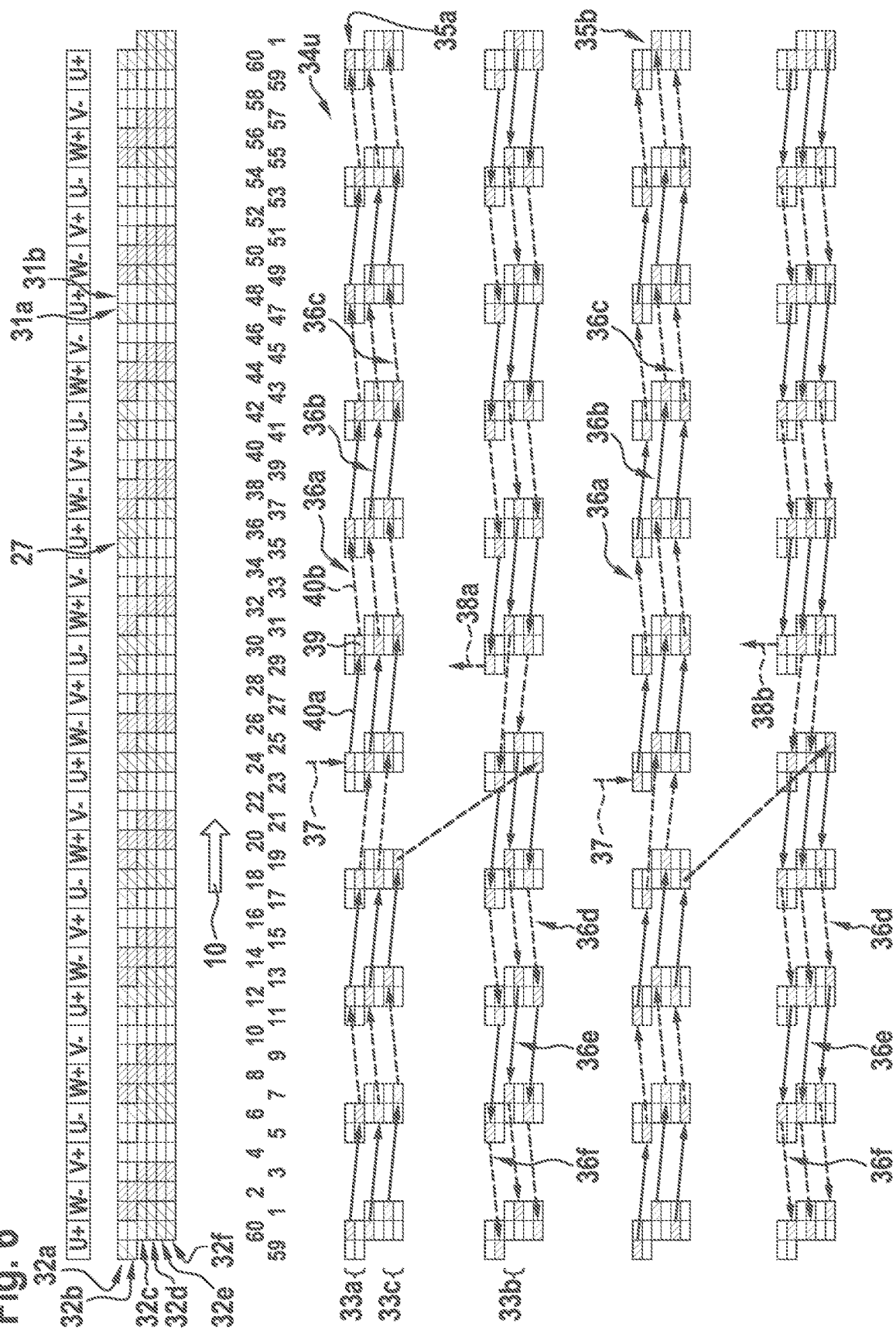
FIG. 6 shows a winding diagram of a phase of the stator winding according to the first exemplary embodiment.

FIG. 6 shows a winding diagram of a phase U of the stator winding 26 according to the first exemplary embodiment;

The stator winding 26 has 2·P=10 poles, N=3 phases and a hole count q=2. The number of slots 22 is 2·P·N·q=60. A slot numbering from 1 to 60 is indicated in FIG. 6. Each sub-winding 35a, 35b comprises the internal portions 39 that are disposed within the slots 22, and connection portions 40, 41 that are disposed on the end sides 24, 25 of the stator core 20 (cf. FIG. 2), and connect in each case in an electrically conductive manner two directly successive internal portions 39 in terms of the current path. The connection portions 40 here are situated on the second end side 25, and the connection portions 41 are situated on the first end side 24. The connection portions 40 are illustrated by solid lines, and the connection portions 41 are illustrated by dashed lines, in FIG. 6.

The stator winding 26 is configured as a wave winding. The conductor sequences 36a-f are in each case configured by a plurality of successive internal portions 39 that are connected in series by connection portions 40, 41 In the first exemplary embodiment, each conductor sequence 36a-f forms a complete encirclement about the stator core 20 in the circumferential direction. The first to third (L/2$^{th}$) conductor sequences 36a-c here run in each case along the preferred rotation direction 10, and the fourth to sixth conductor sequences 36c-f run in each case counter to the first to third conductor sequences 36a-c, thus counter to the preferred rotation direction 10. Each conductor sequence 36a-f is disposed in one of the double tiers 33a-c. Each conductor sequence 36b-f which directly succeeds another conductor sequence 36a-e in terms of the current path, is disposed in a different sub-winding zone 31a, 31b than the other conductor sequence 36a-e. The conductor sequences 36a-f as a result are disposed in an alternating manner in different sub-winding zones 31a, 31b.

The second sub-winding 35b to this extent corresponds to the first sub-winding 35a. In the second sub-winding 35b, a respective internal portion 39 which lies in the same tier 32a-f of the same winding zone 27 as an internal portion 39 of the first sub-winding 35a, is disposed in a different sub-winding zone 31a, 31b than the sub-winding zone 31a, 31b in which the internal portion 39 of the first sub-winding 35a lies.

In both sub-windings 35a, 35b the internal portions 39, which are connected directly by a connection portion 40, 41 and are associated with the same conductor sequence 36a-f, are mutually spaced apart by q·N=6 slots.

In the first sub-winding 35a, the internal portion 39 of the first conductor sequence 36a and the internal portion 39 of the second conductor sequence 36b, which is connected directly to the former by a connection portion 41, are mutually spaced apart by q·N=6 slots. The internal portion 39 of the second conductor sequence 36b and the internal portion 39 of the third conductor sequence 36c, which is connected directly to the former by a connection portion 41, are mutually spaced apart by q·N+1=7 slots. The internal portion 39 of the third conductor sequence 36c and the internal portion 39 of the fourth conductor sequence 36d, which is connected directly to the former by a connection portion 41, are mutually spaced apart by q·N−1=5 slots. The internal portion 39 of the fourth conductor sequence 36d and the internal portion 39 of the fifth conductor sequence 36e, which is connected directly to the former by a connection portion 41, are mutually spaced apart by q·N−1=5 slots. The internal portion 39 of the fifth conductor sequence 36e and the internal portion 39 of the sixth conductor sequence 36f, which is connected directly to the former by a connection portion 41, are mutually spaced apart by q·N+2=8 slots.

In the second sub-winding 35b, the internal portion 39 of the first conductor sequence 36a and the internal portion 39 of the second conductor sequence 36b, which is connected directly to the former by a connection portion 41, are mutually spaced apart by q·N+2=8 slots. The internal portion 39 of the second conductor sequence 36b and the internal portion 39 of the third conductor sequence 36c, which is connected directly to the former by a connection portion 41, are mutually spaced apart by q·N−1=5 slots. The internal portion 39 of the third conductor sequence 36c and the internal portion 39 of the fourth conductor sequence 36d, which is connected directly to the former by a connection portion 41, are mutually spaced apart by q·N+1=7 slots. The internal portion 39 of the fourth conductor sequence 36d and the internal portion 39 of the fifth conductor sequence 36e, which is connected directly to the former by a connection portion 41, are mutually spaced apart by q·N+1=7 slots. The internal portion 39 of the fifth conductor sequence 36e and the internal portion 39 of the sixth conductor sequence 36f, which is connected directly to the former by a connection portion 41, are mutually spaced apart by q·N=6 slots.

As can furthermore be derived from FIG. 6, the first conductor sequences 36a of the sub-windings 35a, 35b are connected to the phase connector 37. The sixth conductor sequences 36f of the sub-windings 35a, 35b are connected to the neutral points 38a, 38b, wherein the sixth conductor sequence 36f of the first sub-winding 35a here is connected to the first neutral point 38a, and the sixth conductor sequence 36f of the second sub-winding 35b is connected to the second neutral point 38b.

The phase windings 34v, 34w of the strands V, W correspond to the previously described phase winding 34u of the strand U, and are disposed in relation to the strand U so as to be displaced by q·N=6 slots in the circumferential direction.

With reference to FIG. 2, the stator winding 26 by way of a multiplicity of shaped conductors 42 is configured as a hairpin winding. The shaped conductors 42 are configured from a metal rod and have a rectangular or radiused rectangular cross section. One part of the shaped conductors 42 has two straight portions 43, 44 which extend in the axial direction within a respective slot 22 and configure the internal portions 39. The straight portions 43, 44 on a first end side 24 of the stator core 20 are connected to one another by way of an end coil portion 45, the latter configuring the connection portion 40b. The end coil portion 45 is configured so as to be integral to the straight portions 43, 44. On a second end side 25 of the stator core 20, each straight portion 43, 44 is adjoined by an end portion 46. The end portions 46 of two respective shaped conductors 42 are mechanically connected to one another in electrically conductive and materially integral manner, in particular by welding. Two end portions 46 that are connected to one another configure a connection portion 40a on the second end side 25. The shaped conductors, which are not illustrated in detail and are connected to one of the phase connectors 37, or one of the neutral points 38a, 38b, respectively, have only one straight portion and one end portion, the latter conjointly with the end portion 46 of a shaped conductor that has two straight portions 43, 44 configuring a connection portion 40a on the second end side 25.

Figure 7:
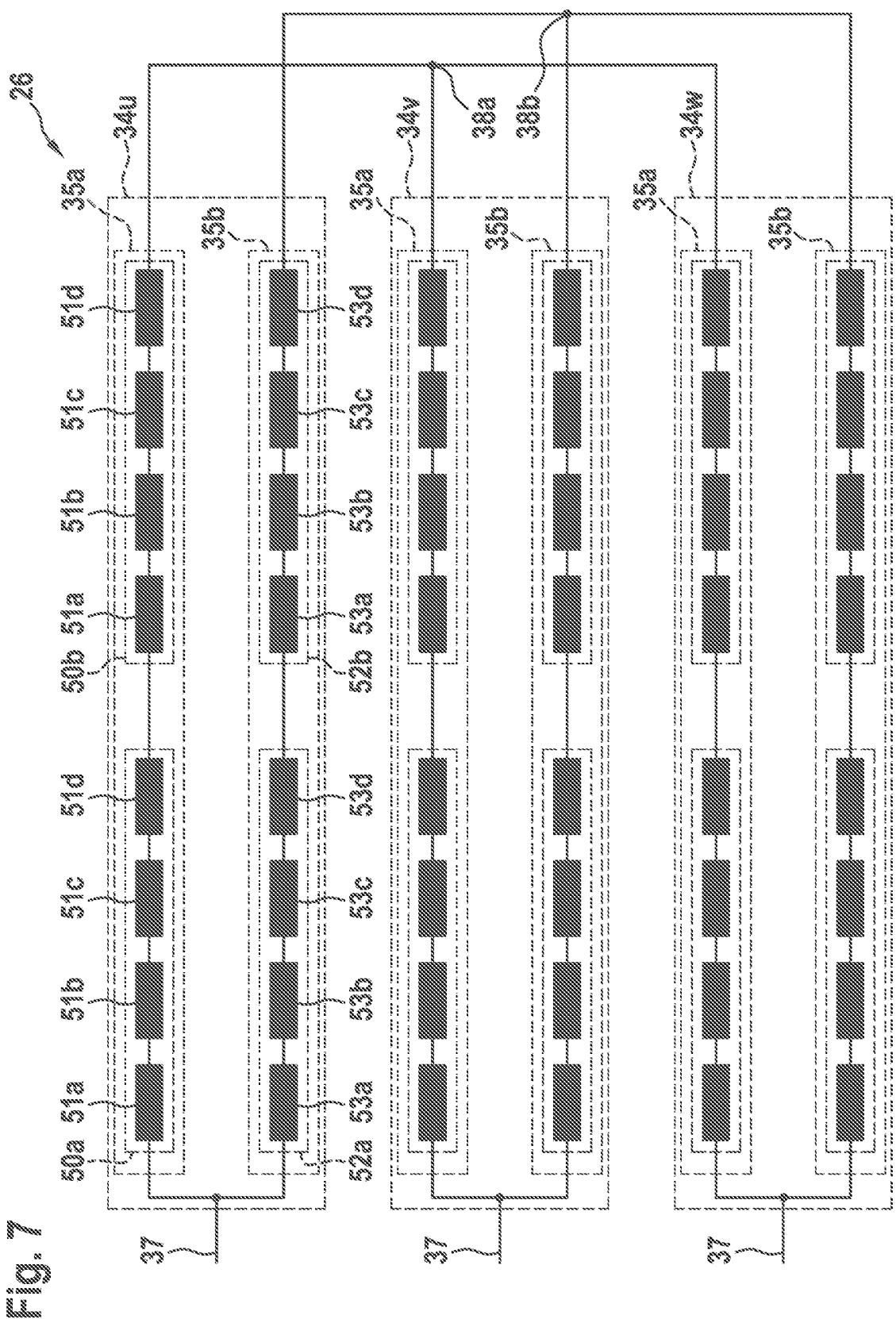
FIG. 7 shows a block circuit diagram of the stator winding according to a second exemplary embodiment of the drive equipment according to the invention.

FIG. 7 shows a block circuit diagram of the stator winding 26 according to a second exemplary embodiment of the drive equipment 2. With the exception of the variances described hereunder, all embodiments pertaining to the further exemplary embodiment can be applied to the second exemplary embodiment. Identical or functionally equivalent components are provided with identical reference signs.

In the second exemplary embodiment, the stator winding 26 is a combined wave/lap winding. The stator winding 26 comprises the first sub-winding 35a of a respective phase winding 34u, 34v, 34w a first set 50a of first to fourth (P$^{th}$) conductor sequences of the first type 51a-d that are successive in the sequence of their designation in terms of the current path. Moreover, the first sub-winding 35a comprises a second set 50b of first to fourth (P$^{th}$) conductor sequences of the first type 51a-d.

The second sub-winding 35b of a respective phase winding 34u, 34v, 34w comprises a first set 52a of first to fourth (P$^{th}$) conductor sequences of the second type 53a-d that are successive in the sequence of their designation in terms of the current path. Moreover, the second sub-winding 35b comprises a second set 52b of first to fourth (P$^{th}$) conductor sequences of the second type 53a-d.

The number of sets 50a, 50b, 52a, 52b of a respective sub-winding 35a, 35b here corresponds to the hole count q.

Figure 8:
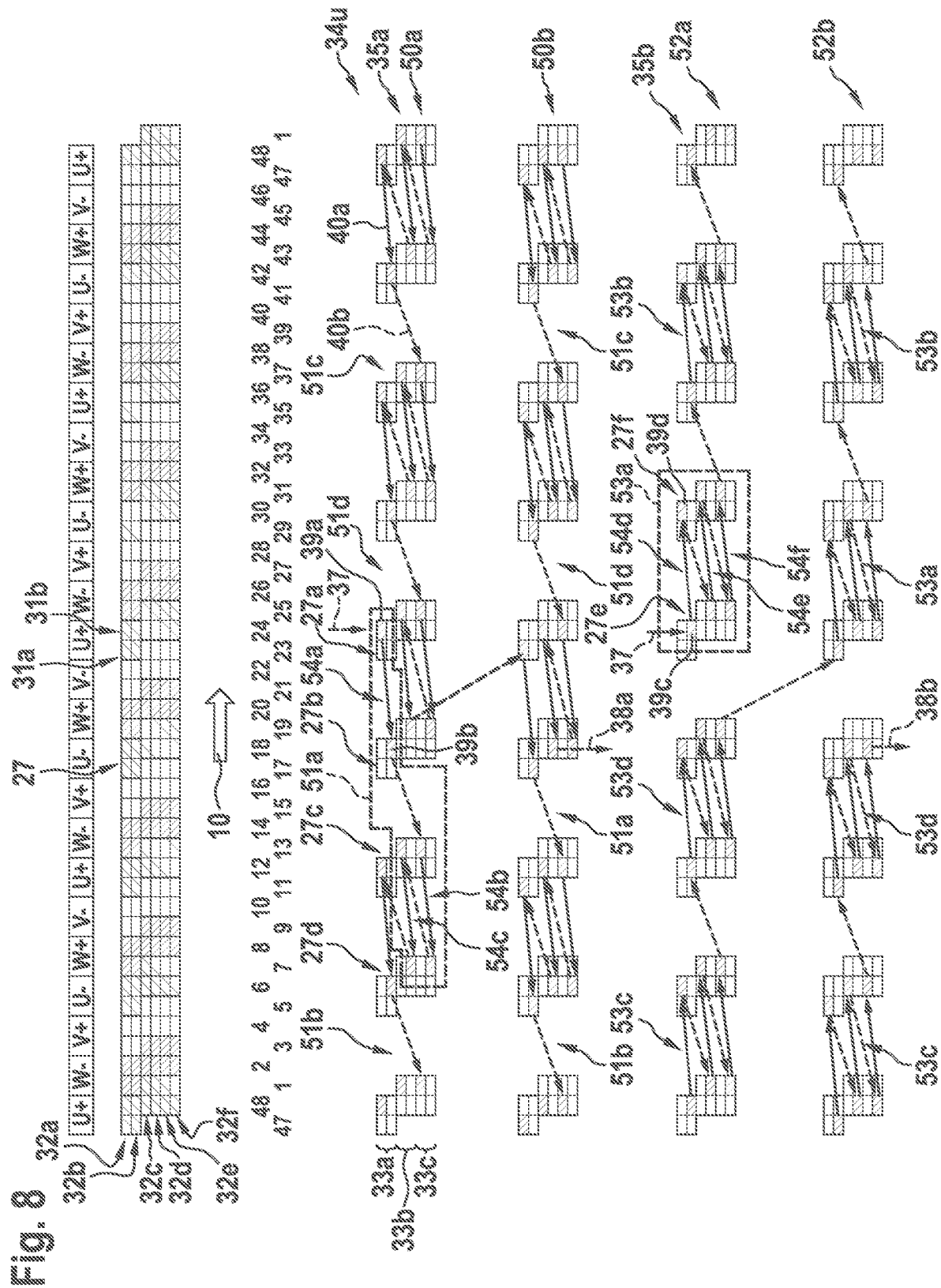
FIG. 8 shows a winding diagram of a phase of the stator winding according to the second exemplary embodiment.

FIG. 8 shows a winding diagram of a phase U of the stator winding 26 according to the second exemplary embodiment.

The stator winding 26 according to the second exemplary embodiment has 2·P=8 poles, and accordingly has 48 slots 22.

Each conductor sequence of the first type 51a-d is disposed in first to fourth directly adjacent winding zones 27a-d for the same strand U, and comprises first to third $[(L/2)^{th}]$ pairs 54a-c of one first internal portion 39a and one second internal portion 39b. The pairs 54a-c are designated according to their sequence along the current path.

The first internal portions 39a and the second internal portions 39b are disposed in different tiers 32a-f of the same double tier 33a-c. The first pair 54a is disposed in the first double tier 33a, the second pair 54b is disposed in the third $[(L/2)^{th}]$ double tier 33c, and the third pair 54c is disposed in the second double tier 33b. In general terms, the third to $(L/2)^{th}$ pairs are disposed in the second to $[(L/2)-1]^{th}$ double tier.

The third winding zone 27c, in which the internal portions 39a, 39b of the first to third conductor sequences of the first type 51a-c $[(P-1)^{th}]$ are disposed, is the first winding zone 27a in which the conductor sequence 51b-d which succeeds the conductor sequence of the first type 51a-c in terms of the current path is disposed Accordingly, the fourth winding zone 27d, in which the internal portions 39a, 39b of the first to third $[(P-1)^{th}]$ conductor sequences of the first type 51a-c are disposed, is the second winding zone 27b in which the conductor sequence of the first type 51b-d, which succeeds the conductor sequence of the first type 51a-c in terms of the current path, is disposed.

Each conductor sequence of the second type 53a-d is disposed in two directly adjacent winding zones 27e, 27f for the same strand U, and comprises first to third $[(L/2)^{th}]$ pairs 54d-f of one first internal portion 39c and one second internal portion 39d The pairs 54d-c are designated according to their sequence along the current path.

The first and second internal portions 39c, 39d are disposed in different tiers 32a-f of the double tier 33a-c, the latter corresponding to the designation of the pair 54d-f. The first to third $[(P-1)^{th}]$ conductor sequences of the second type 53a-c by way of one of the connection portions 40b are connected to the conductor sequence of the second type 53b-d which succeeds along the current path. The succeeding conductor sequence of the second type 53b-d is disposed in two directly adjacent winding zones 27 for the same strand U.

The first and second sub-windings 35a, 35b run about the stator core 20 in opposite circumferential directions, wherein the second sub-winding 35b runs along the preferred rotation direction 10.

In the second exemplary embodiment, the first internal portion 39a, 39c of the pairs 54a-f is disposed in one of the tiers 32a-f of the double tier 33a-c, and the second internal portion 39b, 39d of the pairs 54a-f is disposed in the other tier 32a-f of the double tier.

Figure 9:
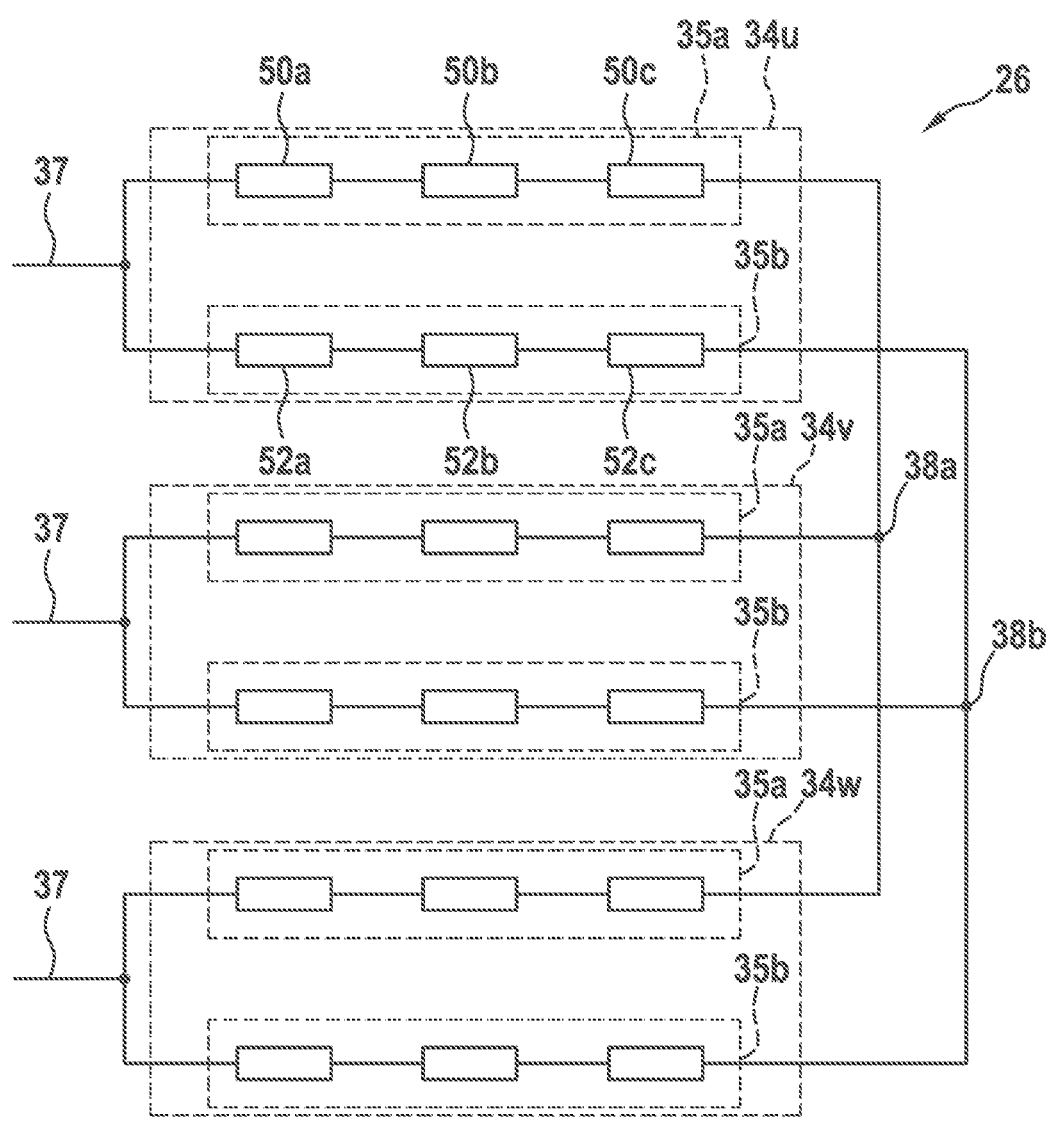
FIG. 9 shows a block circuit diagram of the stator winding according to a third exemplary embodiment of the drive equipment according to the invention.

FIG. 9 shows a block circuit diagram of the stator winding 26 according to a third exemplary embodiment of the drive equipment 2. With the exception of the variances described hereunder, all embodiments pertaining to the second exemplary embodiment can be applied to the third exemplary embodiment. Identical or functionally equivalent components are provided with identical reference signs.

In the third exemplary embodiment, the first sub-winding 35a additionally has a third set 50c of conductor sequences of the first type 51a-d, and the second sub-winding 35b additionally has a third set 52c of conductor sequences of the second type 53a-d, wherein the conductor sequences 51a-d, 53a-d are not illustrated for the sake of clarity in FIG. 9.

FIG. 10 shows a winding diagram of a phase U of the stator winding 26 according to the third exemplary embodiment.

The stator winding 26 according to the third exemplary embodiment, like the second exemplary embodiment, has 2·P=8 poles, but a hole count q=3. Accordingly, the number of slots 22 is 72. It can be derived from the increase in the hole count q that each of the third sets 50c, 52c are provided.

In the third exemplary embodiment, the first internal portion 39a, 39c of the pairs 54a, 54c, 54d, 54f with an odd-numbered designation of the conductor sequences 51a-d, 53a-d of a respective sub-winding 35a, 35b is disposed in one of the tiers 32a-f of the double tier 33a-c, and the second internal portion 39b, 39d of the pairs 54a, 54c, 54d, 54f with an odd-numbered designation of the conductor sequences 51a-d, 53a-d of a respective sub-winding 35a, 35b is disposed in the other tier of the double tier 33a-c. The first internal portion 39a, 39c of the pairs 54b, 54e with an even-numbered designation of the conductor sequences 51a-d, 53a-d of a respective sub-winding 35a, 35b is disposed in the other tier 39b, 39d of the double tier 33a-c, and the second internal portion 39b, 39d of the pairs 54, 54e with an even-numbered designation of the conductor sequences 51a-d, 53a-d of a respective sub-winding 35a, 35b is disposed in the one tier 32a-f of the double tier 33a-c.

In the third exemplary embodiment, the second double tier 33b in relation to the first double tier 33a and the third double tier 33c is moreover displaced counter to the preferred rotation direction 10.

According to further exemplary embodiments, which correspond in each case to one of the previously described exemplary embodiments, the stator winding 26 is not configured as a hairpin winding but as a round-wire winding.

According to further exemplary embodiments, which correspond in each case to one of the previously described exemplary embodiments, the number of poles is larger or smaller, the number of conductor sequences being correspondingly increased or reduced.

According to further exemplary embodiments, which correspond in each case to one of the previously described exemplary embodiments, the stator winding 26 has only one neutral point for all sub-windings 35a, 35b.

The invention claimed is:

1. A drive equipment for an electric vehicle, comprising:
 a stator which is configured for generating a magnetic rotating field and has:
  a stator core which extends along a longitudinal axis and in which a multiplicity of slots are disposed in a circumferential direction, and
  a stator winding which occupies a plurality of winding zones in the slots, wherein each winding zone in a cross-sectional plane that is perpendicular to the longitudinal axis by way of a centric radial division is sub-divided into a first side and into a second side; and
 a converter equipment for converting magnetic energy of the rotating field into a rotating output movement of the drive equipment, wherein the converter equipment comprises:
  a rotor which conjointly with the stator forms a rotating electric machine such that the rotor is able to be set in a rotating rotor movement which, as a function of the rotating field, selectively has one of two opposite rotation directions, and
a transmission portion which is configured for transmitting rotating rotor movements to the rotating output movement
wherein the converter equipment has one of the two rotation directions of the rotating rotor movement as a preferred rotation direction, wherein the second side along the preferred rotation direction succeeds the first side and each winding zone on the first side occupies a smaller cross-sectional area of the slots than on the second side.

2. The drive equipment according to claim 1, wherein an efficiency of the transmission portion in the preferred rotation direction is higher than in the other of the rotation directions, the transmission portion has a gearbox having an asymmetrical design embodiment that defines the preferred rotation direction, the drive equipment has a control equipment for the transmission portion, which for the preferred rotation direction has a larger number of selectable operating modes than for the other one of the rotation directions, and the drive equipment has a ventilation equipment which in the preferred rotation direction has a higher cooling efficiency than in the other one of the rotation directions.

3. The drive equipment according to claim 1, wherein the stator winding is configured as a round-wire winding or as a shaped conductor winding.

4. The drive equipment according to claim 1, wherein:
the stator winding has a number of N strands and a number of 2·P poles, and a number of slots is 2·P·N·q, where q≥2, and each winding zone extends across at least q+1 of the slots, where P, N and q are natural numbers, and
each winding zone is radially subdivided into first to $L^{th}$ tiers which are designated according to their sequence in a radial direction, wherein the tiers configure first to $(L/2)^{th}$ double tiers, wherein the $i^{th}$ double tier comprises the $(2i-1)^{th}$ and the $(2i)^{th}$ tier for all 1≤i≤(L/2), where L≥6 and is even, where L and i are natural numbers.

5. The drive equipment according to claim 4, wherein a number of the double tiers, being lower than the number of the other double tiers, are displaced in relation to the other double tiers counter to the preferred rotation direction by at least one slot.

6. The drive equipment according to claim 4, wherein:
each winding zone in the circumferential direction is subdivided into first to $q^{th}$ sub-winding zones which comprise in each case all tiers and are designated according to their sequence in the circumferential direction,
the stator winding for a respective strand has a phase winding,
the phase winding comprises at least one sub-winding which forms a current path and comprises internal portions that are disposed within the slots and connection portions that are disposed on end sides of the stator core and in each case connect in an electrically conductive manner two internal portions which are directly successive in terms of the current path.

7. The drive equipment according to claim 6, wherein:
the sub-winding comprises a plurality of conductor sequences of internal portions that are successive in terms of the current path,
each conductor sequence is disposed in one of the double tiers and forms a full encirclement of the stator core,
first to $L/2^{th}$ of the conductor sequences run in each case along a circumferential direction, in particular along the preferred rotation direction,
$[(L/2)+1]^{th}$ to $L^{th}$ of the conductor sequences run in each case along a further circumferential direction which is counter to the circumferential direction.

8. The drive equipment according to claim 7, wherein each conductor sequence that directly succeeds another conductor sequence in terms of the current path is disposed in a different sub-winding zone than the other conductor sequence.

9. The drive equipment according to claim 7, wherein:
a further sub-winding, which corresponds to the sub-winding, is provided,
a respective internal portion of the further sub-winding, which lies in the same tier of the same winding zone as an internal portion of the sub-winding, is disposed in a different sub-winding zone than the sub-winding zone in which the internal portion of the sub-winding lies.

10. The drive equipment according to claim 6, wherein:
one of the at least one sub-winding comprises a set of first to $P^{th}$ conductor sequences of a first type that are successive in the sequence of their designation in terms of the current path and are in each case disposed in first to fourth directly adjacent winding zones for the same strand,
each conductor sequence of the first type comprises first to $(L/2)^{th}$ pairs of one first of the internal portions and one second of the internal portions, and the pairs are designated according to their sequence along the current path,
the first and second internal portions are disposed in different tiers of the same double tier,
a first pair is disposed in the first double tier,
a second pair is disposed in the $(L/2)^{th}$ double tier,
a third pair is disposed in the second double tier, or the third to $(L/2)^{th}$ pairs are disposed in the second to $[(L/2)-1]^{th}$ double tier,
a third winding zone, in which the internal portions of the first to $(P-1)^{th}$ conductor sequences are disposed, is the first winding zone in which the conductor sequence that succeeds the conductor sequence in terms of the current path is disposed,
a fourth winding zone, in which the internal portions of the first to $(P-1)^{th}$ conductor sequences are disposed, is a second winding zone in which the conductor sequence that succeeds the conductor sequence in terms of the current path is disposed.

11. The drive equipment according to claim 10, wherein:
one of the at least one sub-winding comprises a set of first to $P^{th}$ conductor sequences of a second type that are successive in the sequence of their designation in terms of the current path and are in each case disposed in two directly adjacent winding zones for the same strand,
each conductor sequence of the second type comprises first to $(L/2)^{th}$ pairs of one first of the internal portions and one second of the internal portions, and the pairs are designated according to their sequence along the current path,
the first and second internal portions are disposed in different tiers of the double tier corresponding to the designation of the pair, and
the first to $(P-1)^{th}$ conductor sequences of the second type by way of one of the connection portions are connected to the conductor sequence of the second type that is successive along the current path, and the succeeding conductor sequence of the second type is disposed in two directly adjacent winding zones for the same strand.

12. The drive equipment according to claim 11, wherein the sub-windings run about the stator core in opposite circumferential directions.

13. The drive equipment according to claim 10, wherein
the first internal portion of the pairs of the conductor sequences of the or of a respective sub-winding is disposed in one of the tiers of the double tier, and the second internal portion of the pairs of the conductor sequences of the or of a respective sub-winding is disposed in the other one of the tiers of the double tier, or the first internal portion of the pairs of the conductor sequences with an odd-numbered designation of the or of a respective sub-winding is disposed in one of the tiers of the double tier, the second internal portion of the pairs of the conductor sequences with an odd-numbered designation of the or of a respective sub-winding is disposed in the other tier of the double tiers, the first internal portion of the pairs of the conductor sequences with an even-numbered designation of the or of a respective sub-winding is disposed in the other tier of the double tier, and the second internal portion of the pairs of the conductor sequences with an even-numbered designation of the or of a respective sub-winding is disposed in the one tier of the double tier.

14. The drive equipment according to claim 10, wherein:
the or a respective sub-winding comprises a total of q sets of the conductor sequences which are in each case disposed in the same sub-winding zone,
each set that directly succeeds another set of the same sub-winding in terms of the current path is disposed in a different sub-winding zone than the other set.

15. A vehicle, comprising a drive equipment according to claim 1, which is configured for driving the vehicle.

* * * * *